United States Patent [19]

Keck et al.

[11] Patent Number: 4,948,217

[45] Date of Patent: Aug. 14, 1990

[54] OPTIC COUPLER

[75] Inventors: Donald B. Keck, Big Flats, N.Y.; Donald R. Lyons, Stanford, Calif.; Daniel A. Nolan, Corning, N.Y.

[73] Assignee: Corning Incorporated, Corning, N.Y.

[21] Appl. No.: 300,961

[22] Filed: Jan. 23, 1989

Related U.S. Application Data

[62] Division of Ser. No. 765,652, Aug. 15, 1985, Pat. No. 4,799,949.

[51] Int. Cl.$^5$ .............................................. G02B 6/26
[52] U.S. Cl. ................................ 350/96.15; 350/96.16; 350/96.30; 350/96.34
[58] Field of Search ............... 350/96.15, 96.16, 96.21, 350/96.30, 96.34

[56] References Cited

U.S. PATENT DOCUMENTS

| | | | |
|---|---|---|---|
| 3,579,316 | 5/1971 | Dyott et al. | 350/96.15 |
| 4,291,940 | 9/1981 | Kawasaki et al. | 350/96.15 |
| 4,360,248 | 11/1982 | Bickel et al. | 350/96.16 |
| 4,392,712 | 7/1983 | Ozeki | 350/96.16 |
| 4,400,055 | 8/1983 | Ozeki et al. | 350/96.15 |
| 4,482,203 | 11/1984 | Stowe et al. | 350/96.15 |
| 4,591,372 | 5/1986 | Bricheno et al. | 65/4.2 |

FOREIGN PATENT DOCUMENTS

| | | | |
|---|---|---|---|
| 60-140208 | 7/1985 | Japan | 350/96.15 |
| WO84/4822 | 12/1984 | PCT Int'l Appl. | 350/96.15 |

OTHER PUBLICATIONS

Lamont et al., Applied Optics, 24(3), Feb. 1, 1985, "Power Transfer in Fused Biconical-Taper Single-Mode Fiber Couplers: Dependence on External Refractive Index", pp. 327-32.

Hill et al., Conference on Optical Fiber Communication (OFC'84), Technical Digest, Jan, 23-25, 1984, New Orleans, LA, "Efficient Coupling-Ratio Control in Single-Mode-Fiber Biconical-Taper Couplers".

Primary Examiner—Frank Gonzalez
Attorney, Agent, or Firm—William J. Simmons, Jr.

[57] ABSTRACT

A low loss fiber optic coupler is fabricated by forming a coupler preform having a plurality of spaced glass cores extending longitudinally through a matrix of glass having a refractive index lower than that of the cores. The preform is heated and stretched to form a glass rod which is then severed into a plurality of units. Heat is applied to the central region of each unit while the ends of the unit are pulled apart to elongate and taper inwardly the heated central region, whereby the cores of the unit are more closely spaced and are of smaller diameter at the central region than they are at the ends of the unit. The unit is then provided with a plurality of optical fibers, one of which extends from each of the cores at the endfaces of the unit. A preferred method of providing the optical fibers involves forming the coupler preform of a matrix glass that is easily dissolved in a solvent. Each of the fiber cores within the matrix is surrounded by a layer of cladding glass that is relatively resistant to dissolving by the solvent. When an end of the unit is immersed in the solvent, the matrix glass dissolves, thereby leaving the unit cores and surrounding solvent-resistant cladding glass protruding from the newly formed endface of the unit.

32 Claims, 3 Drawing Sheets

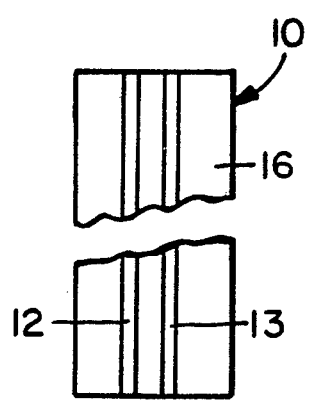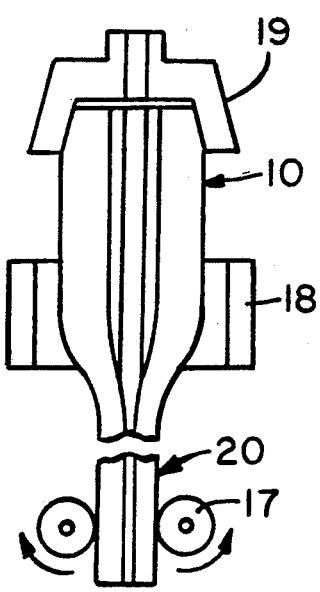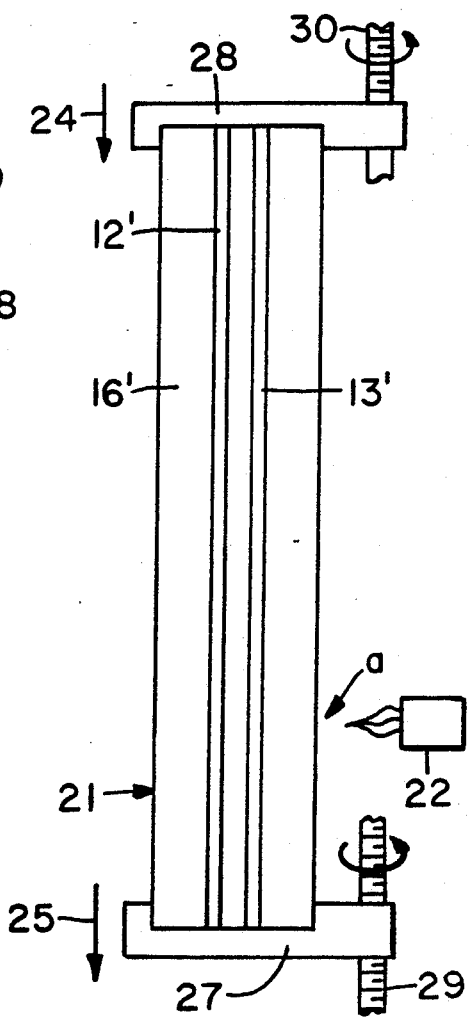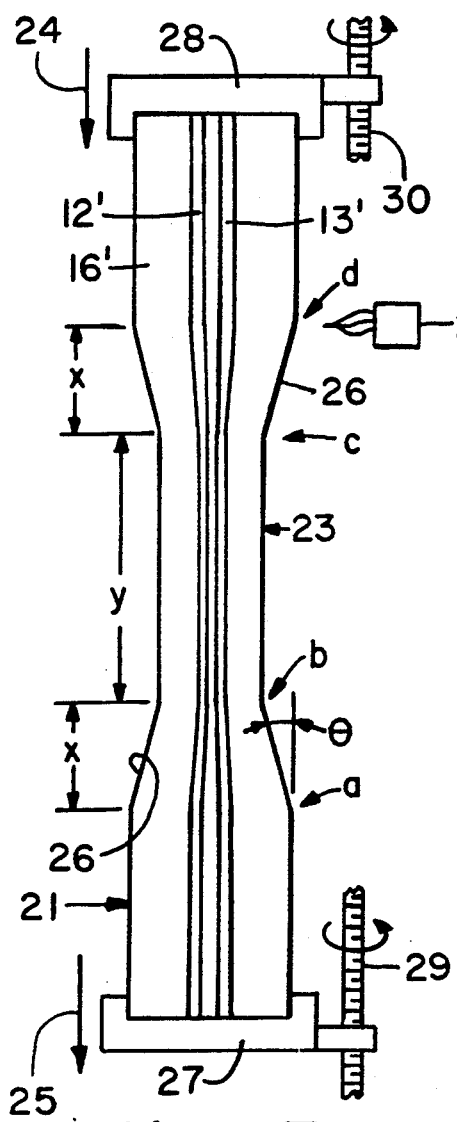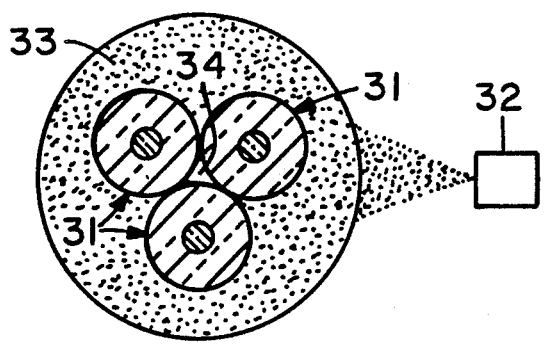

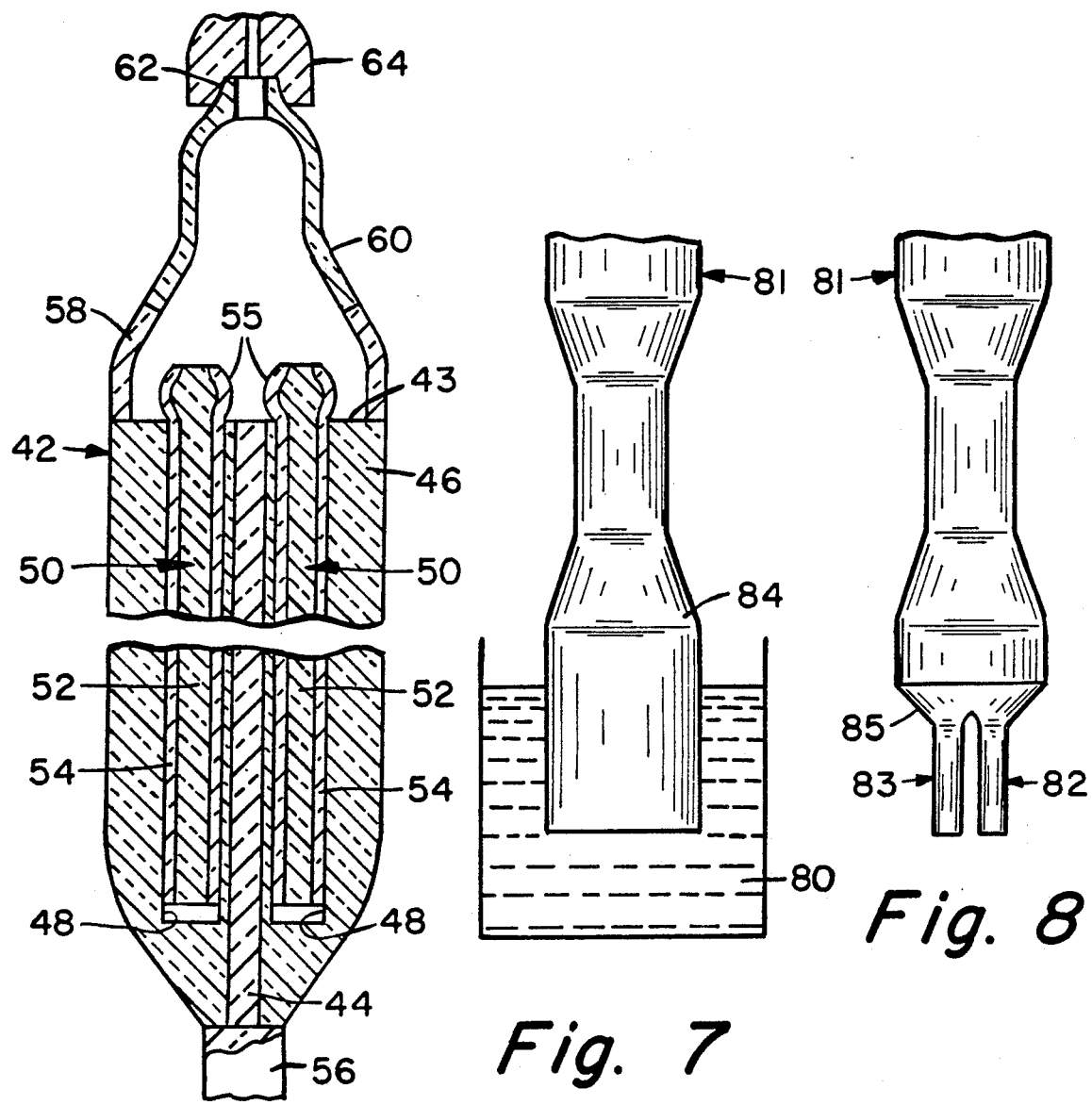
Fig. 5
Fig. 7
Fig. 8
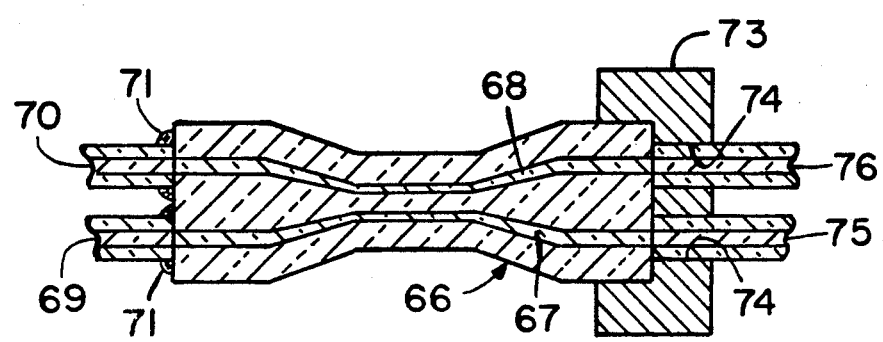
Fig. 6

OPTIC COUPLER

This is a division, of application Ser. No. 765,652, filed Aug. 15, 1985 now U.S. Pat. No. 4,799,949.

CROSS-REFERENCE TO RELATED APPLICATION

This application is related to U.S. patent applications S.N. 765,655 entitled "Fiber Optic Coupler and Method" (G. E. Berkey) and S.N. 765,654 entitled "Optical Fiber-Device Interconnection and Method" (D. B. Keck et al.) filed on even date herewith.

BACKGROUND OF THE INVENTION

The present invention related to fiber optic couplers and more particularly to a low-cost method of making fiber optic couplers.

Certain types of fiber optic systems require couplers in which at least a portion of the light propagating in one fiber is coupled to one or more other fibers.

It has been known that coupling occurs between two closely spaced cores in a multiple core device. The coupling efficiency increases with decreasing core separation and, in the case of single-mode cores, with decreasing core diameter. There have been developed a number of couplers that are based on these principles, and which are capable of low loss operation, i.e. they exhibit a loss of about 1 dB or less.

Multimode and single-mode couplers have been formed by positioning a plurality of fibers side-by-side along a suitable length thereof and fusing the claddings together to secure the fibers and reduce the spacings between the cores. Coupling can be enhanced by stretching and rotating the fibers along the fused length thereof as taught in U.S. Pat. No. 4,426,215. Also, a portion of the cladding is sometimes removed by etching or grinding to decrease the intercore distance as taught in U.S. Pat. No. 4,449,781. These processes are labor intensive and do not always result in the formation of couplers exhibiting the predetermined desired coupling characteristics. This latter mentioned disadvantage is particularly apparent in the manufacture of certain single-mode couplers wherein the coupling core sections are to remain parallel to ensure that the propagation constants are matched.

Whereas most couplers are made by applying heat directly to the fibers to be joined, U.S. Pat. No. 3,579,316 teaches a method wherein the fibers are first inserted into a capillary tube where the ends may overlap. The capillary tube is formed of a glass having a refractive index lower than that of the fiber cladding material. Heat is applied to the capillary tube in the vicinity of fiber overlap and the tube is stretched until the diameter thereof approximates that of the original fibers. The original cores of the pulled-out part become vanishingly small, their stretched diameters being only about 1/100 the original diameters. The cladding of the original fiber becomes the core of the coupling section.

The disadvantages of the method of U.S. Pat. No. 3,579,316 are as follows. The method is costly since fibers must be inserted into a capillary tube for each coupler. Also, the reduction in core diameter to 1/100 of the original diameter results in a lossy coupler, since the original cladding takes the place of the vanished cores. In the region of the coupler where the fiber cores taper from their "vanishingly small" size to their full size, an insufficient amount of the power can transfer from the cladding back to the core. Furthermore, it is difficult to maintain the cores straight and parallel to one another when fibers are inserted into a tube which is then stretched. Such nonlinear coupler cores can lead to decreased coupling efficiency in single-mode couplers.

Control of the excess device loss is a problem with prior art devices. Variability of mode power in the split waveguides exists due to fabrication technique variations. In some devices, bifurcation of the input and output fiber ports is difficult to accomplish. Also many of the prior art fabrication steps are highly labor intensive and are therefore a major cost source.

SUMMARY OF THE INVENTION

It is therefore an object of the present invention to provide a method that overcomes the disadvantages of the prior art. Another object is to provide a low cost method of producing couplers that exhibit low excess device loss. A further object is to provide an easily fabricated optical fiber coupler to which fibers are easily connected.

The present invention pertains to a method of fabricating a fiber optic coupler comprising the following steps. There is initially provided a coupler preform having a plurality of spaced glass cores extending through a matrix of glass having a refractive index lower than that of the glass cores. The cores optionally include means for maintaining the polarization of an optical signal propagating therethrough. The coupler preform is heated and stretched to form a glass rod which is then severed into a plurality of units in which the cores are flush with the endfaces thereof. Heat is applied to the central region of each of the units while one end thereof is pulled relative to the other to elongate and taper inwardly the heated central region thereof, whereby the cores of the unit become more closely spaced and become smaller in diameter at the central region than they are at the ends of the unit. The change in core diameter should not be so abrupt that it adds excessive loss to the coupler.

Various methods may be employed to form the coupler preform. For example, a plurality of fiber preforms, each comprising an axial region of core glass surrounded by a layer of cladding glass, may be disposed in side-by-side relationship and the composite thereof rotated while a coating of particles of the matrix glass is applied thereto. The coating of matrix glass is consolidated to form a coupler preform. Alternatively, a plurality of longitudinally extending holes can be formed in an elongated boule of matrix glass. A fiber preform comprising at least an axial region of core glass is inserted into each of the holes.

It the matrix glass of the coupler preform is made by a chemical vapor deposition technique, the glass can contain striae across which the refractive index varies slightly. During the step of heating and stretching the coupler preform, if the index maximum resulting from the presence of striae is greater than the cladding glass index, the diameter thereof must be reduced sufficiently to ensure that the radial thickness of the striae is small compared to the wavelength of light that is to be transmitted through the coupler.

The central region of a unit can be elongated and tapered inwardly as follows A heated zone is provided for softening a narrow axial region of the unit. Relative movement is provided between the heated zone and the unit while there is applied to the unit a tensile force the magnitude of which depends upon the relative position of the unit with respect to the heated zone. In one embodiment the heated zone is stationary. One end of the unit is moved away from the heated zone while the remaining end thereof is moved in the same direction but at a lower instantaneous velocity. The velocity of the remaining end may be constant during the entire tapering and elongating operation. The velocity of movement of the one end may gradually increase to form a transition region, remain constant to form a coupling region and gradually decrease to form a second transition region.

The method of the present invention may further comprise the step of providing a plurality of optical fibers extending from at least one of the endfaces of the coupler in alignment with each of the coupler cores extending to that endface. The optical fibers may be merely bonded to the coupler endfaces in alignment with the coupler cores. Connection of the optical fibers to the endfaces can be facilitated by applying to the endfaces caps having a plurality of holes, one of the holes being in alignment with a respective one of the coupler cores that terminates at the respective endface. One of the optical fibers is inserted into each of the holes of the termination cap.

In one embodiment the fibers extend from only one end of the coupler. To form such a reflective coupler, the remaining end thereof is provided with a reflective coating.

A preferred method of providing optical fibers in alignment with the coupler cores comprises the following steps. The coupler matrix is formed of a glass that is relatively easily dissolved in a given solvent. Each of the coupler cores is surrounded by a layer of cladding glass that is relatively resistant to being dissolved in the given solvent. The ends of the coupler unit are immersed in a bath of the given solvent to dissolve the immersed region of matrix glass from each end of the unit to thereby expose the ends of the unit cores and the surrounding layer of solvent-resistant cladding glass. The ends of the fibers should protrude at least 1 cm from the respective endface to enable the coupling of additional fibers thereto.

During the step of dissolving matrix glass from the end of a coupler unit, it is preferred that the unit be gradually partially withdrawn from the bath to form a tapered endface and thereby strengthen the protruding fibers.

There results from the preferred method of the present invention a low loss fiber optic coupler comprising an elongated body of matrix glass having two endfaces. A plurality of optical fiber cores extend longitudinally through the body and protrude from one or both endfaces as clad optical fibers. The optical fibers comprise at least a core and an outer layer of cladding glass that is more resistant to being dissolved in a solvent than the matrix glass. The diameters of the central region of the elongated body and of the optical fibers in the central region are smaller than the diameters thereof at the endfaces of the body. Also, the optical fibers are more closely spaced at the central region than at the endfaces. The refractive index of the matrix glass is preferably the same as that of the outer layer of optical fiber cladding glass. For example, the matrix glass may comprise $SiO_2$, $B_2O_3$ and $GeO_2$, whereas the fiber optic cladding glass may consist of $SiO_2$.

BRIEF DESCRIPTION OF THE DRAWINGS

FIG. 1 shows a glass preform that can be utilized in the method of the present invention.

FIG. 2 is a schematic diagram illustrating the stretching of the preform to form a rod.

FIGS. 3 and 3a schematically illustrate the heating and stretching of a severed unit to taper inwardly the central region thereof.

FIGS. 4 and 5 illustrate methods of making the preform of FIG. 1.

FIG. 6 illustrates various techniques for connecting optical fibers to a coupler.

FIG. 7 illustrates an etching technique for removing a portion of the matrix glass to expose the ends of the fibers therein.

FIG. 8 shows a coupler unit after an etching treatment.

DESCRIPTION OF THE PREFERRED EMBODIMENT

Figure 9:
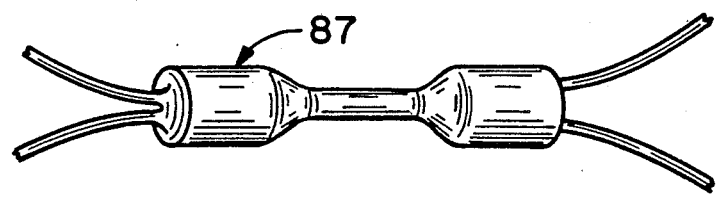
FIG. 9 is an oblique view of a transmissive coupler formed in accordance with the present invention.

It is to be noted that the drawings are illustrative and symbolic of the invention, and there is no intention to indicate scale or relative proportions of the elements shown therein.

As shown in FIG. 1 there is provided a coupler preform 10 comprising a plurality of parallel cores 12 and 13 disposed in a boule 16 of matrix glass. Preform 10 is drawn or stretched by tractors 17 in furnace 18 (FIG. 2) to form multicore coupler rod 20. Rod 20 is sliced into numerous units 21 of suitable length. Vacuum fixture 19 may be attached to the top of preform 10 during stretching.

Referring to FIG. 3 each unit 21 comprises cores 12' and 13' within boule 16' of matrix glass. The central region of unit 21 is subjected to a controlled thermal environment by source 22 while it is stretched to form elongated or necked-down central region 23 of reduced diameter as shown in FIG. 3a. Heat source 22, which must be capable of providing a heated zone along a narrow axial region of the unit, can be a flame, laser or the like.

To form necked-down region 23 there must be provided relative movement between source 22 and unit 21 while controlled tension is applied to the unit by pulling one end thereof relative to the other. These conditions can be fulfilled as follows. For purposes of the present description, heat source 22 is considered to be a ring burner capable of surrounding and directing heat radially inwardly toward unit 21. After the unit is inserted through the ring burner, the ends thereof are clamped to stages 27 and 28. Stages 27 and 28 are vertically movable by rotating threaded shafts 29 and 30, respectively, which extend through threaded bores in those stages. Shafts 29 and 30 are connected to motors (not shown) the speed of which can be programmed to vary with respect to time. Burner 22 is ignited and initially directs a ring of flame inwardly toward unit 21 at point a. Stage 28 begins to move downwardly (arrow 24) at a constant velocity, and stage 27 begins to move downwardly (arrow 25) at a slightly greater velocity. The faster rate of movement of stage 27 causes unit 21 to become elongated as it moves downwardly through the stationary ring burner. The velocity of stage 27 increases in a linear manner as the relative position of burner 22 moves from point a to point b on unit 21. The velocity of stage 27 remains constant until the relative position of burner 22 coincides with point c. Thereafter, the velocity of stage 27 decreases in a linear manner until the relative position of the burner is adjacent to point d. At this time the flame is extinguished, and both stages stop moving. The aforementioned description illustrates one of various techniques for providing relative movement between the heat source and unit 21 while applying tension to the unit.

The device formed by the method of FIGS. 3 and 3a can function as an optical waveguide coupler since light propagating in one core will couple to the other cores in necked down region 23 where the cores are brought closer together and have reduced diameters. Away from necked down region 23, light does not couple from one core to the other since the cores are separated by a distance greater than the coupling distance.

The diameter of the fibers in the non-necked down region is determined by the size of the fibers to be connected thereto. The cores must be reduced in diameter by some minimum amount in the coupling region in order to obtain effective coupling. However, as the cores in the coupling region become smaller, the energy propagating therein is more susceptible to imperfections and bends which will cause light to radiate from the core. Low loss multimode couplers, i.e. those having a loss less than 1 dB, have been made with diameter ratios as low as 1/10, and those having parabolic profiles have been made with diameter ratios as low as 1/8. Low loss single-mode couplers have been made with diameter ratios as low as 1/3.5. It is thought that the ratio of the core diameter in the necked-down region to that in the non necked-down region should be no smaller than about 1/20 to avoid excessive loss. It is theorized that energy is transferred from the core region into the matrix glass in the necked-down coupling region and that a lesser amount of energy will transfer from the matrix glass back to the core or cores if the change in core diameter is too great.

It is known that coupling can be further enhanced for certain types of couplers by rotating one end of unit 21 with respect to the other while it is being stretched. This could be accomplished by inserting one end of unit 21 in a rotatable chuck that is mounted on one of the stages 27 and 28. Such twisting of the coupling region causes the guided light to extend further into the cladding from the core in which propagation was initiated.

Preform 10 of FIG. 1 can be formed by any one of a plurality of well known techniques. As shown in FIG. 4, a plurality of optical fiber preforms 31 are secured together in side-by-side relation by means such as heating the contacting surfaces with a flame. If preforms 31 are of the conventional size from which optical fibers are drawn, it may be necessary to stretch them until a desired smaller diameter is achieved. The composite of the fiber preforms is then mounted in a lathe where it is rotated and longitudinally translated with respect to the burner 32 which deposits a coating 33 of cladding soot thereon. Coating 33 can be consolidated to form a preform of the type illustrated in FIG. 1. The aperture 34 between fiber preforms 31 can be eliminated by applying a vacuum thereto during the stretching operation illustrated in FIG. 2. It could also be eliminated before coating 33 is applied by applying a vacuum thereto while heating and stretching the composite of optical fiber preforms 31.

Preform 10 of FIG. 1 could also be formed by core drilling holes in a boule of pure cladding glass or in an optical fiber preform, inserting rods of core material into the holes, and heating the resultant glass body to seal the core rods to the cladding glass. The sealing operation may consist of the heating and stretching operation of FIG. 2.

In the embodiment illustrated in FIG. 5 preform 42, which comprises core portion 44 and cladding portion 46 of matrix glass, may be made by any known technique. One end is preferably severed from preform 42 to form a flat endface 43. Two holes 48 are formed in the matrix glass on opposite sides of core 44 by any suitable technique such as core drilling, ultrasonic drilling, or the like. Holes 48 may terminate just short of one end of preform 42 as shown in FIG. 5, or they may extend entirely therethrough. Holes 48 are preferably treated to remove imperfections from the walls thereof. For example, the wall-forming surfaces can be smoothed by a diamond hone or grinding powder and/or etched with hydrofluoric acid. However, in a preferred technique, the walls of holes 48 are smoothed by suspending the preform in a furance and raising its temperature to a level just below that which would cause the preform to elongate. For high $SiO_2$ content blanks this temperature is in the range of 1850-1900° C.

Into holes 48 are inserted glass rods 50. Although rods 50 may have a uniform composition throughout, it may be advantageous to employ composite rods which comprise a core region 52 surrounded by a layer 54 of cladding glass having a refractive index equal to or greater than that of the matrix glass 46. Since the glass which forms cores 52 may be relatively soft, it may be advantageous to clad such core glass with a hard glass to preserve the shape of the core during the stretching process. Without such hard glass cladding, a soft core glass rod can melt during the stretching process and build up a pressure which can distort the true size and shape of the core rods.

The following technique may also be employed to prevent the core rods from melting and sliding downwardly into the holes. Upper ends 55 of the rods can be enlarged so that upon insertion of the rods into holes 48, the enlarged ends bind at endface 43 and protrude from the preform. The enlarged end can be formed by heating the end with a flame and pressing the end against a surface to cause it to bulge. The enlarged ends of the rods do not prevent evacuation of the space between the rods and the adjacent walls of the holes.

The assembly illustrated in FIG. 5 is inserted into a conventional draw furnace and stretched as illustrated in FIG. 2. A glass rod 56 may be fused to the end of preform 42 to initiate the stretching process. During the stretching process, rods 50 soften and bond to the walls of holes 48. Thus, there is formed an integral preform that is substantially free from interstices, gaps, bubbles or the like.

A vacuum connection is preferably secured to the top of draw blank 42 during the stretching operation. This minimizes the amount of gas and water vapor present in the gaps between rods 50 and the walls of holes 48. A preferred method of attaching a vacuum connection is as follows. Prior to inserting rods 50 into holes 48, a tube 58 of high temperture glass such as silica is fused to surface 43. The outer diameter of tube 58 is preferably the same as that of preform 42. If rods 50 had been inserted prior to the fusion of tube 58 to preform 42, the softer glass within rods 50 could flow and fill the gaps between the rods and the preform. Thus, when the vacuum is applied over end 43 of the preform, that vacuum would be prevented from communicating with the lower ends of holes 48.

The end of tube 58 opposite the preform may be tapered inwardly. Such a taper can be effected by flameworking the tube. The diameter of the tapered end of the tube should be large enough to permit the insertion of rods 50 therethrough. After rods 50 have been inserted into holes 48, a glass fitting 60 is fused to tube 58. The end of fitting 60 is provided with a ground glass joint 62 to which vacuum connection 64 can be attached.

If the initially-formed preform has a uniform composition throughout, i.e. it initially has no core portion, then it can be provided with predetermined number of cores by drilling therein that predetermined number of holes and placing a rod of core glass into each hole.

FIG. 6 illustrates two different techniques that can be employed to connect optical fibers to a coupler. Coupler 66 comprises two cores 67 and 68. Fibers 69 and 70 are affixed to one end of coupler 66 by bonding material 71. Connecting the fibers in this manner is a tedious and time-consuming task since the fibers must be aligned with the coupler cores and then held in that alignment until the bonding material hardens.

A cap 73, which is affixed to the second end of coupler 66 has two apertures 74 that are aligned with coupler cores 67 and 68. When fibers 75 and 76 are inserted into holes 74, they are thus aligned with cores 67 and 68, respectively.

An improved method for providing a coupler having fibers extending therefrom is illustrated in FIGS. 7–9. The coupler preform may be formed by core drilling two holes in a homogeneous core glass boule which is of the type shown in FIG. 5 but which does not contain central core 44. The boule 46 is formed of a material that is more soluble in a given solvent than the material of fibers 50, or at least it is more soluble than the cladding 54 of fibers 50. For example, fibers 50 may comprise a germania silicate core 52 and a silica cladding 54. These glasses, especially the silica cladding, are resistant to etching in hydrofluoric acid. Boule 46 can be formed of a boro germania silicate glass that is more soluble in hydrofluoric acid than silica. The amounts of $B_2O_3$ and $GeO_2$ in boule 46 are preferably adjusted so that the refractive index of boule 46 is substantially the same as or less than that of silica cladding 54.

After the above-described preform has been stretched and cut into units (FIG. 2) and necked down in the center (FIGS. 3 and 3a), the end of the resultant unit 81 is suspended in an acid bath 80 as shown in FIG. 7. The acid etches or dissolves matrix glass 84, thereby leaving the fiber ends 82 and 83 protruding from endface 85 as shown in FIG. 8. The length of unit 81 must be sufficient to provide the desired length of protruding fibers 82 and 83. Since the length of unit 81 that is immersed in acid is much greater than the radius thereof, the acid etches radially inwardly to dissolve cladding material from fibers 82 and 83 before those fibers have been appreciably shortened by etching.

The remaining end of unit 81 is then immersed in acid to expose the ends of fibers 82 and 83 therein. A coupler 87 as shown in FIG. 9 is thus formed. The fibers protruding from the coupler can be fused to other fibers or fit into connector assemblies. The original diameter of the fibers employed in the preform of FIG. 5 and the size reduction that occurs in the stretching operation of FIG. 2 can be such that the fibers protruding from coupler 87 are the same diameter as the fibers that are to be connected thereto.

If unit 81 remains at the same level in the acid during the entire etching operation, endface 85 will be relatively flat. The fibers are easily broken at such a flat endface. The preferred method therefore involves the gradual partial withdrawal of unit 81 from the acid bath during the entire duration of the etching operation. The unit could be withdrawn a few centimeters during the etching process to form a tapered endface 85 as shown in FIG. 8. The gradual tapering of the matrix glass from the fibers results in a stronger coupler.

To facilitate the coupling of optical fibers to fibers 82 and 83, it is thought that they should protrude at least 1.0 cm from endface 85. Couplers having fibers protruding as much as 0.5 m have been formed by the above-described etching technique.

Matrix glass 46 may consist of any material that is more soluble than the material of fibers 50. One set of materials that could be utilized is described in U.S. Pat. No. 4,112,170. The $BaO$-$B_2O_3$-$SiO_2$ glasses described in that patent are more readily leachable in nitric acid than lead silicate glasses that are used therewith. Another approach would be to construct the etchable material from a photosensitive glass such as that sold under the trade name of "Photo-Ceram" by Corning Glass Works. This glass is processed by selectively exposing that portion thereof that is to be etched to ultraviolet light. This material is then heat treated at about 592° C. for about 30 minutes. The exposed glass is attacked at a much faster etching rate than the non-exposed glass by a suitable etchant such as a 12% solution of hydrofluoric acid in water.

It is noted that the light attenuation properties of the glasses from which a coupler is constructed are not as critical as are the properties of glasses from which long lengths of fibers are made since the coupling distance may be only about 1–10 cm and the distance between the claddings of the coupled fibers is preferably less than 10 $\mu$m. Coupling has been achieved with cladding separation as large as 30 $\mu$m.

Whereas the etching of a single coupler unit has been described hereinabove, a plurality of units could be simultaneously etched in the same bath for more economic production.

It should be understood that the method of the present invention can be used to make single-mode or multimode couplers. The refractive index profiles of the cores within the coupler may be the same as the profiles of the fibers that are to be connected to the coupler. Most multimode fibers have an $\alpha$-value of about 2.0 to optimize bandwidth. The $\alpha$-values of the multimode coupler cores might be between about 3 and 10 to enhance coupling and minimize splicing loss. Step index ($\alpha = \infty$) coupler cores enhance coupling even more but are more lossy at a splice of the coupler pigtail and a conventional multimode fiber having an $\alpha$-value of about 2.

Whereas matrix glass 16 of FIG. 1 may be formed by any suitable technique such as melting, it is preferred that it be made by a chemical vapor deposition (CVD) process whereby the resultant glass is ultra pure, and the coupler can therefore exhibit extremely low loss operation. The matrix glass 33 of FIG. 4 is illustrated as being deposited by a flame oxidation burner. The boule 42 of FIG. 5 can readily be formed by a CVD technique. Although very pure glass can be deposited by CVD techniques, the resultant boule or preform consists of many concentric layers. Since slight refractive index variations exist across each layer, scattering loss can occur in a coupler formed of such layered glass unless the thickness of each layer is less than the wavelength of light to be propagated through the coupler. For couplers made by a CVD technique, the stretching ratio, i.e. the ratio of the length of multicore coupler rod 20 (FIG. 2) to that of coupler preform 10 (FIG. 1), must be sufficient to reduce the thickness of the deposited glass layers to less than the wavelength of light if the index maximum resulting from the presence of striae is greater than the index of the cladding glass.

Figure 10:
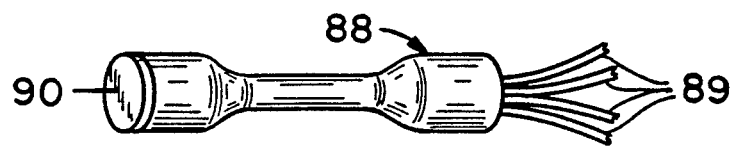
FIG. 10 is an oblique view of reflective coupler formed in accordance with the present invention.

FIG. 10 shows a reflective star coupler 88 produced in accordance with the method of the present invention. Optical fibers 89 protrude from one end thereof. The opposite endface is ground and polished to a surface that is substantially perpendicular to the longitudinal axis of the coupler. A reflective surface 90 such as a layer of silver is deposited on the polished endface.

The present invention is readily adapted to the fabrication of polarization maintaining couplers which are useful for coupling energy between fibers of the types described in U.S. Pat. Nos. 4,415,230, 4,478,489 and 4,493,530, for example.

Figure 11:
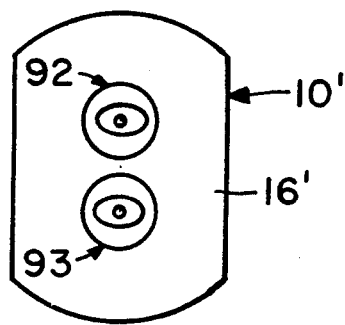
FIGS. 11 and 12 are cross-sectional views of coupler preforms that can be used to form single polarization, single-mode couplers.

As illustrated in FIG. 11 coupler preform 10' may consist of boule 16' of matrix glass in which there is situated polarization retaining single-mode fiber preforms 92 and 93. The fiber preforms 92 and 93 each comprise a core surrounded by an oblong inner cladding layer. An outer layer of stress cladding glass, which has a circular outer surface, surrounds the inner cladding layer. The temperature coefficient of expansion (TCE) of the stress cladding glass is different from that of the inner cladding glass. The outer layer of stress cladding glass could consist of pure silica and thus be resistant to dissolving in an etchant. Two opposing sides of preform 10' may be sawed or ground flat to faciliate the orientation of the coupler with single polarization single-mode fibers that are to be connected thereto.

Coupler preform 10' could be made by the method discussed in conjunction with FIG. 5. Parallel holes are drilled in a boule of etchable glass. The opposite sides are ground flat. A polarization retaining single-mode preform of the type illustrated in FIG. 11 is inserted into each hole, care being taken to properly orient them. The resultant preform is subjected to the processing steps illustrated in FIGS. 2, 3 and 7. The outer layer of stress cladding glass could consist of pure silica and thus be resistant to dissolving in the etchant.

Figure 12:
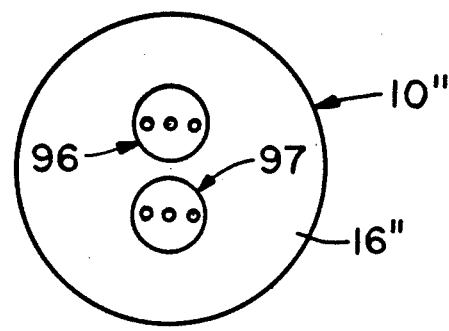

Coupler preform 10" of FIG. 12 comprises boule 16" of matrix glass in which there are disposed polarization retaining single-mode fiber preforms 96 and 97. The fiber preforms 96 and 97 each comprise a core surrounded by a layer of cladding glass which may consist of pure silica and thus be resistant to dissolving in an etchant. Diametrically disposed on opposite sides of the core are two stress rods of glass having a TCE different from that of the cladding glass. Coupler preform 16" can be formed in a manner similar to that described in connection with FIG. 11.

A preferred method of forming a coupler by an etching technique is disclosed in said related Berkey application. In accordance with that method a mandrel was rotated and translated with respect to a glass soot deposition burner. There was deposited on the mandrel a soot preform comprising 11 wt. % $B_2O_3$, 6.1 wt. % $GeO_2$ and 82.9 wt. % $SiO_2$. The mandrel was removed, and the preform was consolidated to form a boule having an axial aperture.

A single mode optical fiber preform was made by the soot deposition technique disclosed in U.S. Pat. No. 4,486,212. The core consisted of 10 wt. % $GeO_2$ and 90 wt. % $SiO_2$. The cladding consisted of pure $SiO_2$. The resultant blank, which had a diameter of 52 mm, was stretched into a rod having a diameter of 7 mm. A section of the rod was rotated and translated while there was applied thereto a coating of the same composition of boro-germania silicate soot that was used to form the boule. The resultant preform was consolidated and then transferred hot to a redraw furnace where it was stretched into a 1.5 mm diameter rod. This rod was severed into pieces of about 22 cm length. The rod was cut with a torch to prevent fracture due to the expansion mismatch between the coating and the remainder of the rod.

Two rods were fused together at both ends, and a knob was formed at one end. The rods were inserted into the boule aperture, and were suspended from the top of the boule by the knob. A vacuum connection was affixed to the top of the boule and the aperture was evacuated, the bottom thereof being closed. The resultant coupler preform was heated to about 1950° C. and stretched into a multicore coupler rod having a diameter of 3 mm. The rod was cut into units having a length of 15 cm.

Each unit was necked down in an apparatus of the type illustrated on FIGS. 3 and 3a. The unit was first inserted through a ring burner, and the ends thereof were clamped to a lower stage 27 and an upper stage 28. The burner was ignited and initially directed a ring of flame inwardly toward the unit at point a (see FIG. 3a). Stage 28 began to move downwardly at a constant rate of 0.035 cm/sec, and stage 60 began to move downwardly at a rate of 0.075 cm/sec. The faster rate of movement of stage 60 caused unit 21 to become elongated as it moved downwardly through the stationary ring burner. The velocity of sage 27 increased in a linear manner from 0.075 cm/sec to 0.5 cm/sec as the relative position of burner 58 moved from point a to point b on unit 53. The velocity of stage 27 remained at 0.5 cm/sec until the relative position of burner 58 coincided with point c. Thereafter, the velocity of stage 60 decreased in a linear manner until it achieved a velocity of 0.05 cm/sec as the relative position of the burner reached point d. At this time the flame was extinguished and both stages stopped moving.

The stretched unit was 18 cm long, and the taper angle $\theta$ at both tapered regions was about 6°. The diameter of the necked-down region was about 0.75 mm. The length x of each of the tapered regions was about 1 cm, and the length of the coupling region was about 5 cm.

One end of the unit was submersed to a depth of 6 cm in 50% HF for approximately 2 ½ hours until it was observed that the matrix glass has been dissolved from the fibers. During the etching process the unit was withdrawn a few centimeters to form a tapered endface. The etching step was then repeated at the opposite end of the unit. The resultant coupler was 18 cm long and had 6 cm long, 125 $\mu$m diameter fibers protruding from each end. It is estimated that the thickness of the etchable glass separating the fibers in the coupling region was about 2 μm.

The above-described method was employed to construct 3 dB single-mode couplers designed for use at 1550 nm. Such couplers exhibited a loss of less than 1 dB.

We claim:

1. A fiber optic coupler comprising
   an elongated body of matrix glass, said body having two endfaces, said matrix glass being relatively easily etched in a given acid,
   a plurality of optical fibers extending longitudinally through said body and protruding from at least one endface thereof, said fibers having at least a core and an outer layer of cladding glass which is more resistant to being etched in said given acid than said matrix glass, the refractive index of said cladding glass being greater than that of said matrix glass, the diameters of said central region and of said elongated body and of said optical fibers in said central region being smaller than the diameters thereof at the endfaces of said body and said optical fibers being more closely spaced at said central region than at said endfaces.

2. A fiber optic coupler in accordance with claim 1 wherein said matrix glass comprises $SiO_2$, $B_2O_3$ and $GeO_2$ and said fiber optic cladding glass consists of $SiO_2$.

3. A fiber optic coupler in accordance with claim 1 wherein a plurality of optical fibers extend from both ends of said body.

4. A fiber optic coupler in accordance with claim 1 wherein that endface from which said fibers protrude is tapered such that said body is shortest at the periphery of said endface and more elongated axially in the vicinity of said fibers.

5. A fiber optic coupler in accordance with claim 1 wherein said plurality of optical fibers comprise means for maintaining the polarization of light energy propagating therethrough.

6. A fiber optic coupler in accordance with claim 1 wherein the diameters of said cores in the central region of said body are no smaller than 1/20 the diameter thereof at the endfaces of said body.

7. A fiber optic coupler in accordance with claim 1 wherein said optical fibers protrude at least 1 cm from said endfaces.

8. A fiber optic coupler in accordance with claim 1 wherein said given acid is hydrofluoric acid.

9. A fiber optic coupler comprising
   an elongated body of matrix glass, said body having end regions of given diameter, and a central region which tapers from said given diameter to a diameter smaller than said given diameter,
   a plurality of optical fibers extending longitudinally through said body, said fibers having at least a core and a layer of cladding glass, the refractive index of said cladding glass being greater than that of said matrix glass, the diameters of said optical fibers in said central region being smaller than the diameters thereof at said end regions, said cores being more closely spaced at said central region than at said end regions, the distance between said cores in said central region being sufficiently close that energy propagating in one of said fibers couples to the other of said fibers, the diameters of said cores in said central region being no smaller than 1/20 the diameters thereof at said end regions.

10. A fiber optic coupler in accordance with claim 9 wherein said core glass and said matrix glass comprise doped $SiO_2$ and said cladding glass consists essentially of $SiO_2$.

11. A fiber optic coupler in accordance with claim 9 wherein said matrix glass comprises $SiO_2$ and at least one dopant which decreases the refractive index thereof.

12. A fiber optic coupler in accordance with claim 9 wherein said matrix glass is integrally bonded to said optical fibers throughout at least that part of said central region at which said cores are sufficiently close that energy propagating in one of said fibers couples to the other of said fibers, whereby the interface between said fibers and said matrix glass in the energy coupling region is free from interstices.

13. A fiber optic coupler in accordance with claim 9 wherein said optical fibers protrude at least 1 cm from at least one of said end regions.

14. A fiber optic coupler in accordance with claim 9 wherein said central region comprises a constant diameter region, each end of which is connected to said end regions by a tapered region.

15. A fiber optic coupler in accordance with claim 9 wherein said cores are disposed in a parallel, untwisted relationship.

16. A fiber optic coupler in accordance with claim 9 wherein the minimum diameter of said central region is sufficiently great that said coupler is self-supporting.

17. A fiber optic coupler in accordance with claim 9 wherein the minimum diameter of said central region is about 0.75 mm.

18. A fiber optic coupler in accordance with claim 9 wherein said body has an endface at each end thereof, said matrix glass being integrally bonded to said fibers throughout said body, there being no interstices between said fibers and said matrix glass.

19. A fiber optic coupler in accordance with claim 9 wherein the softening point temperature of said cladding glass is higher than that of said matrix glass.

20. A fiber optic coupler comprising
    an elongated body of doped $SiO_2$ matrix glass, said body having end regions of given diameter, and a central region which tapers from said given diameter to a diameter smaller than said given diameter,
    a plurality of linearly disposed, untwisted optical fibers extending longitudinally through said body, said fibers having at least a doped $SiO_2$ core and a layer of $SiO_2$ cladding glass, said cores being more closely spaced in said central region than in said end regions, the refractive index of said cladding glass being greater than that of said matrix glass, said matrix glass being integrally bonded to said fibers throughout at least that part of said central region at which said cores are sufficiently close that energy propagating in one of said fibers couples to the other of said fibers, whereby the interface between said fibers and said matrix glass in the energy coupling region is free from interstices, the diameters of said optical fibers in said central region being smaller than the diameters thereof at said end regions, the diameters of said cores in the central region being no smaller than 1/20 the diameters thereof at said end regions.

21. A fiber optic coupler in accordance with claim 20 wherein the minimum diameter of said central region is sufficiently great that said coupler is self-supporting.

22. A fiber optic coupler in accordance with claim 20 wherein the minimum diameter of said central region is about 0.75 mm.

23. A fiber optic coupler in accordance with claim 20 wherein said body has an endface at each end thereof, said matrix glass being integrally bonded to said fibers throughout said body, there being no interstices between said fibers and said matrix glass.

24. A fiber optic coupler in accordance with claim 20 wherein the softening point temperature of said cladding glass is higher than that of said matrix glass.

25. A fiber optic coupler for transferring energy from one input optical fiber to at least one other input optical fiber, said coupler comprising an elongated body of matrix glass, said body having end regions of a given diameter, and a central region which tapers from said given diameter to a diameter smaller than said given diameter, the minimum diameter of said central region being sufficiently great that said coupler is a self-supporting structure, a plurality of light-conducting glass cores extending longitudinally through said body, the refractive index of said cores being greater than that of said matrix glass, the diameters of said cores in said central region being smaller than the diameters thereof at said end regions but being no smaller than 1/20 the diameters thereof at said end regions, the spacing between said cores in said central region being less than the spacing between said cores in said end regions, the spacing between said glass cores in said central region being sufficiently small that energy propagating in one of said cores couples to the other of said cores.

26. A fiber optic coupler in accordance with claim 25 wherein the diameter of said central region is greater than the sum of the diameters of said input optical fibers.

27. A fiber optic coupler in accordance with claim 25 wherein the diameter of said central region is about 0.75 mm.

28. A fiber optic coupler in accordance with claim 25 wherein said matrix glass is integrally bonded to said cores throughout at least that part of said central region at which said cores are sufficiently close that energy propagating in one of said cores couples to the other of said cores.

29. A fiber optic coupler in accordance with claim 25 wherein said central region comprises a constant diameter region, each end of which is connected to said end regions by a tapered region.

30. A fiber optic coupler in accordance with claim 25 wherein said cores are disposed in a parallel, untwisted relationship.

31. A fiber optic coupler in accordance with claim 25 wherein said body has an endface at each end thereof, said matrix glass being integrally bonded to said cores throughout said body, there being no interstices within said body.

32. A fiber optic coupler in accordance with claim 25 wherein said core glass and said matrix glass comprise doped $SiO_2$.

* * * * *